United States Patent [19]
Suzuki et al.

[11] Patent Number: 5,801,463
[45] Date of Patent: Sep. 1, 1998

[54] DYNAMOELECTRIC MACHINE

[75] Inventors: Yuzuru Suzuki, Shizuoka-ken; Sakae Fujitani, Hamakita; Kenichi Makino, Shizuoka-ken, all of Japan

[73] Assignee: Minebea Co., Ltd., Nagano-Ken, Japan

[21] Appl. No.: 877,490

[22] Filed: Jun. 17, 1997

[30] Foreign Application Priority Data

Jun. 26, 1996 [JP] Japan ................... 8-166466

[51] Int. Cl.$^6$ ................................ H02K 1/16
[52] U.S. Cl. ................. 310/51; 310/156; 310/254
[58] Field of Search ................. 310/51, 156, 254, 310/187, 185, 186

[56] References Cited

U.S. PATENT DOCUMENTS

| | | | |
|---|---|---|---|
| 4,751,416 | 6/1988 | Jörök | 310/156 |
| 5,386,162 | 1/1995 | Horst | 310/51 |
| 5,410,200 | 4/1995 | Sakamoto et al. | 310/49 R |

*Primary Examiner*—Clayton E. LaBalle
*Assistant Examiner*—Judson H. Jones
*Attorney, Agent, or Firm*—Howell & Haferkamp, L.C.

[57] ABSTRACT

In a two-phase, half-wave drive brushless motor or other dynamoelectric machine, a cogging torque reduction effect can be achieved without any reduction in motor output by reducing the number of auxiliary slots on the main pole surface or auxiliary pole surface and the number of winding slots provided between the main poles and the auxiliary poles. A dynamoelectric machine, comprising: a permanent-magnet field portion having 2 n magnetic poles (where n is an even number); an armature core portion having 2 n main poles disposed facing each other at prescribed intervals in relation to the field portion, and 2 n auxiliary poles disposed between the main poles; and auxiliary slots provided on the surfaces of the main poles or auxiliary poles that face the field portion; wherein, assuming that nk (where k is an integer of 4 or greater) is the combined number of the winding slots provided between the main poles and auxiliary poles and of the auxiliary slots provided on the surfaces of the main poles or commutating poles, all the winding slots and auxiliary slots are divided into two groups of nk/2 slots each; the slots of the first group occupy positions $\phi_i$ that satisfy, in terms of electrical angle, the relation $\phi_i=(2\pi/k)i+2\pi p$ (i=0, 1, 2, ..., (nk/2)-1; p is an integer of $0\leq p\leq 5(n-1)$); and the slots of the second group occupy positions $\phi_j$ that satisfy the relation $\phi_j=(2\pi/k)j+2\pi q+\pi/k$ (j=0, 1, 2, ..., (nk/2)-1; q is an integer of $0\leq q\leq(n-1)$).

13 Claims, 10 Drawing Sheets

DYNAMOELECTRIC MACHINE

BACKGROUND OF THE INVENTION

1. Field of the Invention

The present invention relates to a two-phase, half-wave drive brushless motor or other dynamoelectric machine characterized by reduced vibration or rotation nonuniformity due to cogging torque.

2. Description of the Related Art

Two-phase, half-wave drive brushless motors equipped with armature cores have been used as inexpensively manufacturable brushless motors because of their simple drive circuit structure and coil structure, easy detection of rotor position and the like. However, the motor of this type develops torque variations (so-called cogging torque) due to the interaction between the armature core and permanent magnets of the field portion, and these variations result in vibration or fluctuating rotational speed.

To address this problem, a method for reducing the cogging torque has been proposed in Japanese Laid-Open Patent Application 55-71162 and elsewhere by forming auxiliary slots in the armature core of a two-phase, half-wave drive motor and arranging winding slots provided between main poles and auxiliary poles and the auxiliary slots at substantially regular intervals.

This method, however, requires that a large number of auxiliary slots be provided when the aim is to achieve the anticipated reduction effect for the cogging torque, and harmonic cogging torque in particular, bringing about a reduction in magnetic flux which effectively interlinks with the armature and the field portion, and inevitably causing a marked reduction in motor output.

SUMMARY OF THE INVENTION

An object of the present invention is to provide a dynamoelectric machine in which a cogging torque reduction effect can be achieved without any reduction in motor output by reducing the number of winding slots provided between the main poles and the auxiliary poles and reducing the number of auxiliary slots on the main pole surface.

Aimed at attaining the above-mentioned object, the present invention pertains to a dynamoelectric machine comprising: a permanent-magnet field portion having $2n$ magnetic poles (where $n$ is an even number); an armature core portion having $2n$ main poles disposed facing each other at prescribed intervals in relation to this field portion, and $2n$ auxiliary poles disposed between these main poles; and auxiliary slots provided on the surfaces of said main poles or auxiliary poles that face the field portion; wherein, assuming that $nk$ (where $k$ is an integer of 4 or greater) is the combined number of the winding slots provided between the main poles and auxiliary poles and of the auxiliary slots provided on the surfaces of the main poles or auxiliary poles, all the winding slots and auxiliary slots are divided into two groups of $nk/2$ slots each; the slots of the first group occupy positions $\phi_i$ that satisfy, in terms of electrical angle, the relation $$\phi_i = (2\pi/k)i + 2\pi p \qquad (1)$$

(where $i = 0, 1, 2, \ldots, (nk/2)-1$; and $p$ is $0 \leq p \leq$ integer of $(n-1)$); and the slots of the second group occupy positions $\phi_j$ that satisfy the relation $$\phi_j = (2\pi/k)j + 2\pi q + \pi/k \qquad (2)$$

(where $j = 0, 1, 2, \ldots, (nk/2)-1$; and $q$ is $0 \leq q \leq$ integer of $(n-1)$).

In addition, the tips of the main poles and the tips (hammers) of the auxiliary poles differ in width to accommodate the winding slots in the slot positions.

DETAILED DESCRIPTION OF THE PREFERRED EMBODIMENTS

The present invention will now be described with reference to drawings.

Prior to the description of embodiments of the present invention, a theoretical description will be given regarding the technical principles of the present invention.

Generally, a cogging torque is the sum of cogging torques originating in each winding slot and in each auxiliary slots formed in the tips of the armature core.

Figure 1:
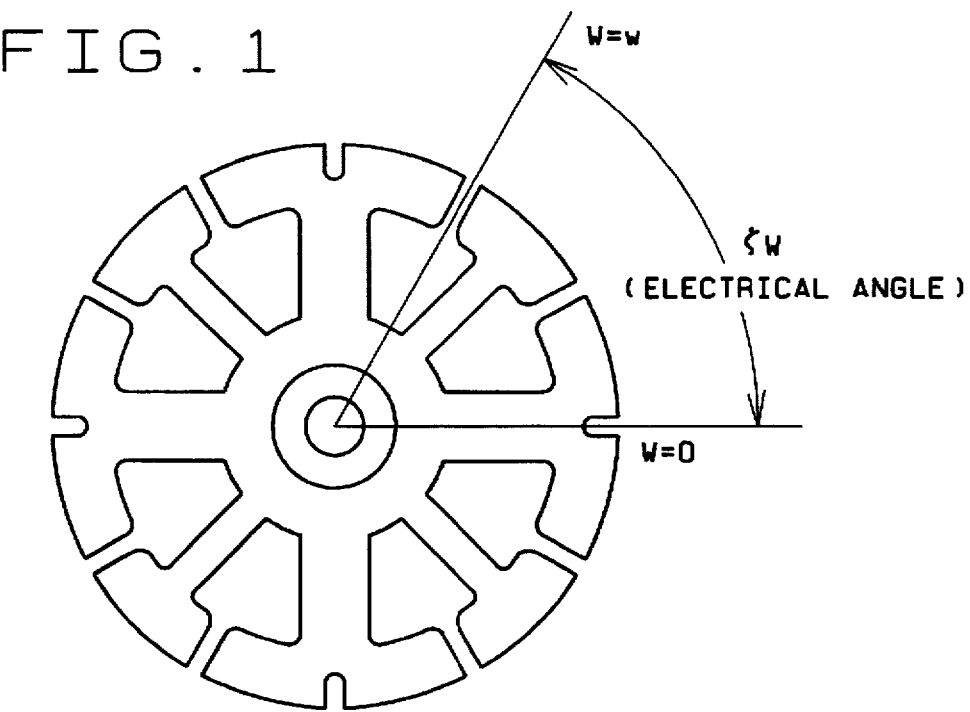
FIG. 1 is a diagram illustrating the electrical angle $\zeta_w$.

The cogging torque originating in each winding slot and in each of the auxiliary slots formed in the tips of the armature core is equal to the angular change of the magnetic energy stored between the field portion, on the one hand, and each winding slot and each of the auxiliary slots of the armature core, on the other hand. Because the magnetic energy is a periodic function whose period is equal to the electrical angle $2\pi$, the cogging torque can be subjected to a Fourier series expansion. If the winding slots and the auxiliary slots in the tips of the armature core are constituted to be magnetically equivalent with respect to field permanent magnets, the cogging torque $T_0$ originating in the 0-th slot and the cogging torque $T_w$ originating in the w-th slot can be expressed as in Equations (3) and (4).

$$T_0(\theta)=A_1\sin(\theta+\phi_1)+A_2\sin2(\theta+\phi_2)+A_3\sin3(\theta+\phi_3)+\ldots \quad (3)$$

$$T_w(\theta)=T_0(\theta+\zeta_w) \quad (4)$$

where $A_1, A_2, A_3, \ldots$ and $\phi_1, \phi_2, \phi_3, \ldots$ are constants; $\theta$ is the angle (electrical angle) made between the rotor and the 0-th slot; and $\zeta_w$ is the angle made between the 0-th slot and the w-th slot (see FIG. 1).

The sum $T_c(\theta)$ of the cogging torques is obtained by summating, for each groove, the cogging torques $T_w$ originating in the w-th groove expressed by Equation (4). The result is expressed by Equation (5) below.

$$T_c(\theta)=\sum_w T_w(\theta)=\sum_m\sum_w A_m\sin\{m(\theta+\zeta_w+\phi_m)\}=\sum_m\{T_c(\theta)\}_m \quad (5)$$

where m is a natural number, and $\{T_c(\theta)\}_m$ is the m-order component of the cogging torque $T_c(\theta)$, expressed by Equation (4) below.

$$\{T_c(\theta)\}_m=\sum_w A_m\sin\{m(\theta+\zeta_w+\phi_m)\} \quad (6)$$

Here, to reduce the cogging torque, the $\zeta_w$ value of each slot, that is, the slot position, should be set in such a way that the $\{T_c(\theta)\}_m$ terms cancel out each other.

The description that follows will first deal with a case in which the winding slots and auxiliary slots are positioned at regular intervals between the main poles and the auxiliary poles, as in the past.

If nk slots (nk is the total number of winding slots and auxiliary slots, where k is an integer of 4 or greater) are positioned, in terms of mechanical angle, at regular intervals of $2\pi$, then each of the slots will occupy the position expressed by Equation (7).

$$\zeta_w=(2\pi/k)w \quad (7)$$

The m-order component of the corresponding cogging torque expressed by Equation (6) is expressed by Equation (8).

$$\{T_c(\theta)\}_m=\sum_w A_m\sin\{m(\theta+2\pi w/k+\phi_m)\} \quad (8)$$

Let us determine the m-value, that is, the order of the components of the cogging torque that are canceled by the terms of the series in Equation (8). Here, the $Q_m(\theta)$ value expressed by Equation (9) is obtained by shifting the phase of the m-order component of the cogging torque by a constant $m\cdot\phi_m$ and dividing the result by a constant $A_m$.

$$\{T_c(\theta-\phi_m)\}_m/A_m=\sum_w\sin(m\theta+2\pi mw/k)=Q_m(\theta) \quad (9)$$

In Equation (9), $\{T_c(\theta)\}=0$ when $Q_m(\theta)=0$. By transforming Equation (9), we obtain Equation (10).

$$\begin{aligned}Q_m(\theta) &= \sum_w\{\sin(m\theta)\cdot\cos(2\pi mw/k)+\cos(m\theta)\cdot\sin(2\pi mw/k)\} \\ &= \sin(m\theta)\cdot\sum_w\cos(2\pi mw/k)+\cos(m\theta)\cdot\sum_w\sin(2\pi mw/k)\end{aligned} \quad (10)$$

If $Q_m(\theta)=0$ for any $\theta$, then Equation (11) holds true $$\sum_w\cos(2\pi mw/k)=\sum_w\sin(2\pi mw/k)=0 \quad (11)$$

and, therefore, $Q_m(\theta)=0$ for any $\theta$ if Equation (11) is valid. It is assumed here that a set of $\cos(2\pi mw/k)$ and $\sin(2\pi mw/k)$ can be expressed by Equation (12) as vector $V_m(w)$.

$$V_m(w)=\{\cos(2\pi mw/k),\sin(2\pi mw/k)\} \quad (12)$$

Figure 2:
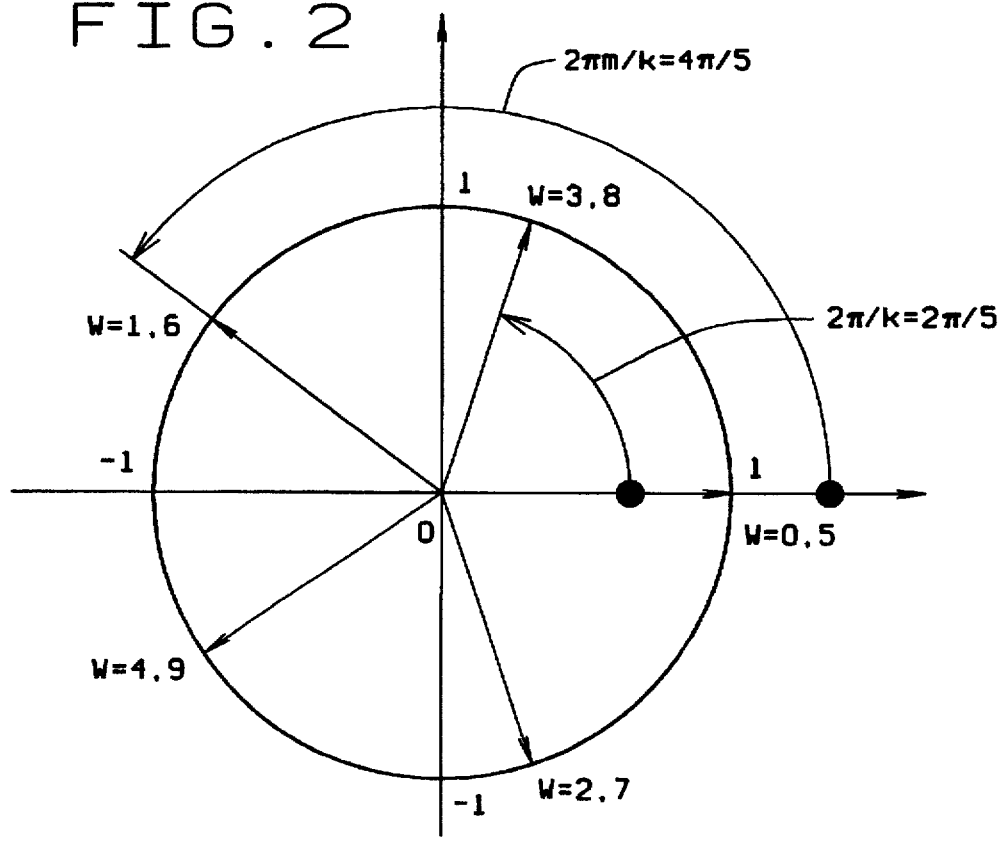
FIG. 2 depicts vector $Vm(w)$ under a certain set of conditions ($n=2$, $k=5$, $m=2$)
Figure 3:
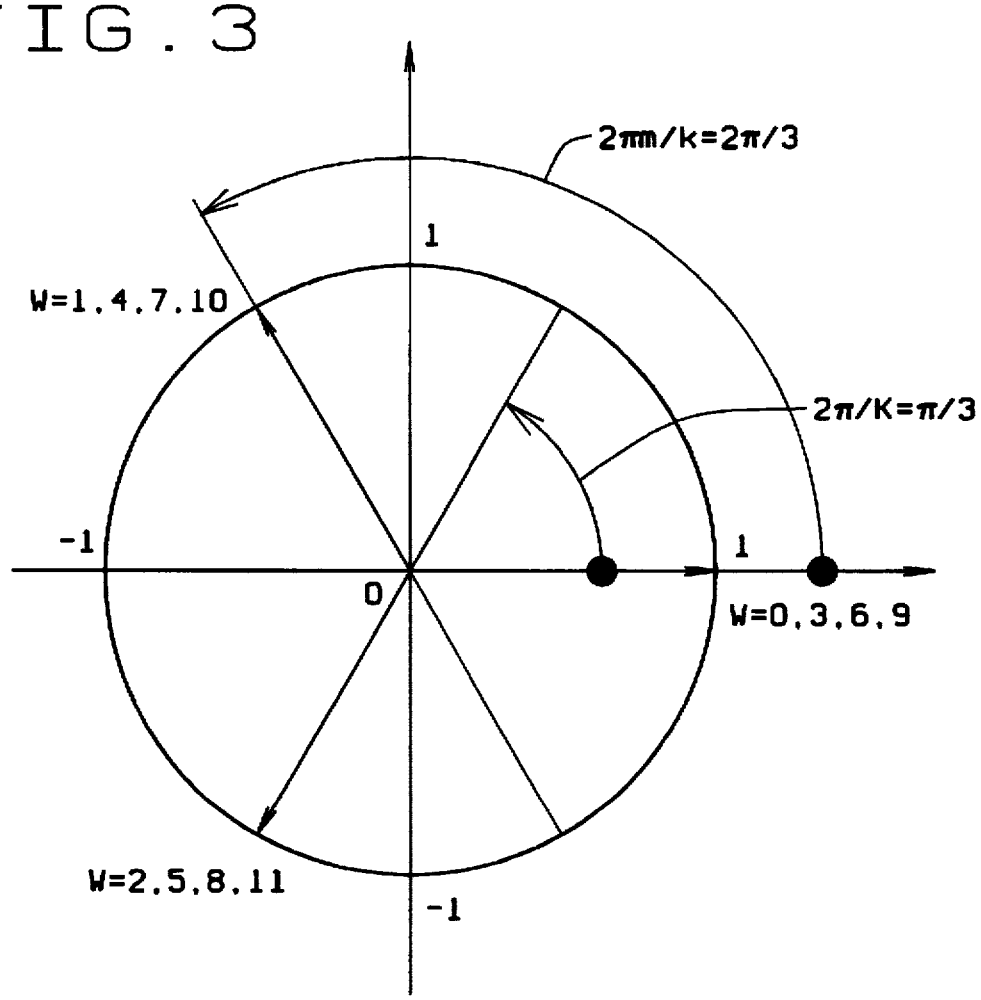
FIG. 3 depicts vector $Vm(w)$ under a different set of conditions ($n=2$, $k=6$, $m=2$)

Setting the number of slots at k and designating the order of the cogging torque under consideration as m, it is possible to assign nk vectors $V_m(w)$ to each w (each slot). For example, FIG. 2 shows such $V_m(w)$ vectors for n=2, k=5, and m=2 (and, consequently, w=0 to 9, and $\Delta w$=5), and FIG. 3 shows such $V_m(w)$ vectors for n=2, k=6, and m=2 (and, consequently, w=0 to 11, and $\Delta w$=3).

Next, the following can be obtained on the assumption that $\Delta w$ is the minimum $\Delta w'$ (where $\Delta w'$ is a natural number) at which Equation (13) below still holds true for the 0-th slot.

$$V_m(0)=V_m(\Delta w') \quad (13)$$

Because Equation (14) can be obtained from Equation (12), the following is valid:

$$(2\pi m/k)\cdot\Delta w=2\pi a \quad (14)$$

(where a is the minimum natural number for which the Equation (14) is true). $\Delta w$ can be expressed by Equation (15) below.

$$\Delta w=ak/m=LCM(m,k)/m \quad (15)$$

where LCM (m, k) is the least common multiple of m and k. In this case, the overall result is that the nk vectors $V_m(w)$ of each $\Delta w$ unit are equal to each other if the count is started from w=0, so $\Delta w$ vector groups (where $\Delta w$ is the number of groups) composed of $nk/\Delta w$ vectors having equal orientation and a size of 1 are arranged at regular angular intervals (electrical angles) of $2\pi/\Delta w$. Because the tips of the vectors in each vector group are at the apices of positive $\Delta w$ rectangles symmetrical about the origin O, Equation (16) holds true if $\Delta w\neq 1$; that is, if LCM (m, k)/m$\neq 1$, and, consequently, LCM (m, k)$\neq$m, giving m$\neq$hk (where h is a natural number).

$$\sum V_m(w)=\left\{\sum_w\cos(2\pi mw/k),\sum_w\sin(2\pi mw/k)\right\}=(0,0) \quad (16)$$

It follows from Equation (16) that $Q_m(\theta)=0$, and, consequently, $\{T_c(\theta)\}_m=0$.

In other words, the m-order components of a cogging torque for which m$\neq$hk are canceled out in a reciprocal manner by the variable-phase cogging torques generated by the slots arranged at regular intervals.

The following ensues due to the existence of a first group of slots, which is composed of nk/2 slots and for which the phase (electrical angle) is expressed by Equation (17), and a second group of slots, which is composed of nk/2 slots and for which the phase is expressed by Equation (18), as in the present invention.

$$\phi_i=(2\pi/k)i+2\pi p \quad (17)$$

(where i=1, 2, 3, ..., (nk/2)-1; and p is an integer of $1\leq p\leq(n-1)$)

$$\phi_j = (2\pi/k)j + 2\pi q + \pi/k \quad (18)$$

(where $j=1, 2, 3, \ldots, (nk/2)-1$; and q is an integer of $1 \leq q \leq (n-1)$). The m-order components $\{T_c(\theta)\}_{m1}$ of the cogging torques generated by the slots of the first group can be expressed by Equation (19)

$$\{T_c(\theta)\}_{m1} = \sum_i A_m \sin\{m(\theta + 2\pi i/k + 2\pi p + \phi_m)\} = \quad (19)$$

$$\sum_i A_m \sin\{m(\theta + 2\pi i/k + \phi_m)\}$$

making it possible to apply the reasoning of Equation (19) and to allow the slots of this group to cancel out the m-order components of those cogging torques for which $m \neq hk$. Similarly, the m-order components $\{T_c(\theta)\}_{m2}$ of the cogging torques generated by the slots of the second group can be expressed by Equation (20).

$$\{T_c(\theta)\}_{m2} = \sum_j A_m \sin\{m(\theta + 2\pi j/k + 2\pi q + \pi/k + \phi_m)\} = \quad (20)$$

$$\sum_j A_m \sin\{m(\theta + 2\pi j/k + 2\pi q + \phi'_m)\}$$

(where $\phi'_m = \phi_m + \pi/k$; constant), making it possible to apply the reasoning of Equation (19) and to allow the slots of this group to cancel out those m-order components of the cogging torques for which $m \neq hk$. In addition, there is a phase difference of $\pi/k$ between the first and second groups of slots, so the m-order components of the cogging torque generated by both the first and the second groups of slots will be expressed by Equation (21).

$$\{T_c(\theta)\}_m = \{T_c(\theta)\}_{m1} + \{T_c(\theta)\}_{m2} = \{T_c(\theta)\}_{m1} + \{T_c(\theta + \pi/k)\}_{m1} \quad (21)$$

Here, Equation (22) can be derived from Equation (19).

$$\{T_c(\theta + \pi/k)\}_{m1} = \sum_i A_m \sin\{m(\theta + 2\pi i/k + \pi/k + \phi_m)\} \quad (22)$$

Equation (23) is valid when the $m(\pi/k)$ in Equation (22) is an odd multiple of $\pi$, that is, when $m = h_0 k$ (where $h_0$ is an odd natural number).

$$\{T_c(\theta + \pi/k)\}_{m1} = \sum_i A_m \sin\{m(\theta + 2\pi i/k + \phi_m) + h_0 \pi\} = \quad (23)$$

$$\sum_i -A_m \sin\{m(\theta + 2\pi i/k + \phi_m)\} = -\{T_c(\theta)\}_{m1}$$

Equation (24) can thus be obtained.

$$\{T_c(\theta)\}_m = \{T_c(\theta)\}_{m1} - \{T_c(\theta)\}_{m1} = 0 \quad (24)$$

Specifically, when m is an odd multiple of k, the cogging torque of the first group of slots and the cogging torque of the second group of slots cancel out each other due to the phase difference between the groups.

It can thus be seen that when nk slots are provided in order to reduce the cogging torque, arranging the slots at a constant pitch (as in the case of prior art), makes it possible to cancel out components ranging the first-order components to the (k−1)-order components of the cogging torque, as well as those m-order components for which the m is not a natural multiple of k, whereas the method of the present invention, in addition to demonstrating the cogging reduction effect provided by the conventional constant-pitch arrangement, makes it possible to cancel out the k-order components of the cogging torque as well as the m-order components, including those for which the m is an odd multiple of k.

Embodiments of the present invention based on these technical principles will now be described.

Figure 4:
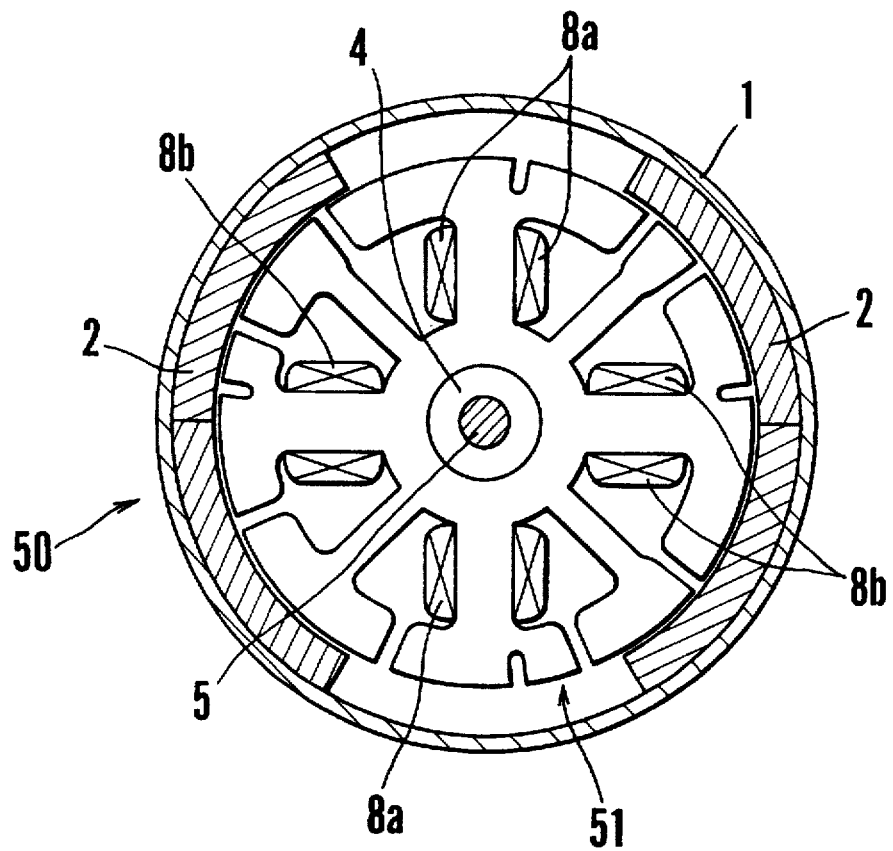
FIG. 4 is a plan view of an embodiment of the two-phase, half-wave, four-pole drive brushless motor in accordance with the present invention.
Figure 5:
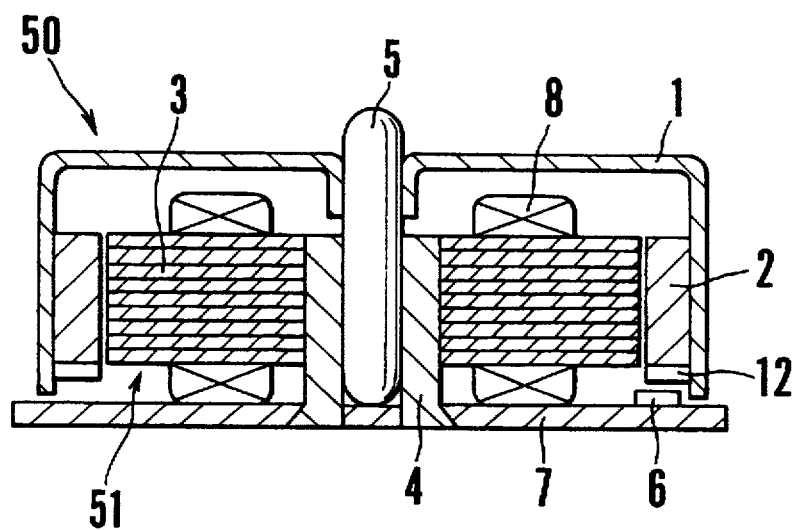
FIG. 5 is a longitudinal section of the motor depicted in FIG. 4.
Figure 6:
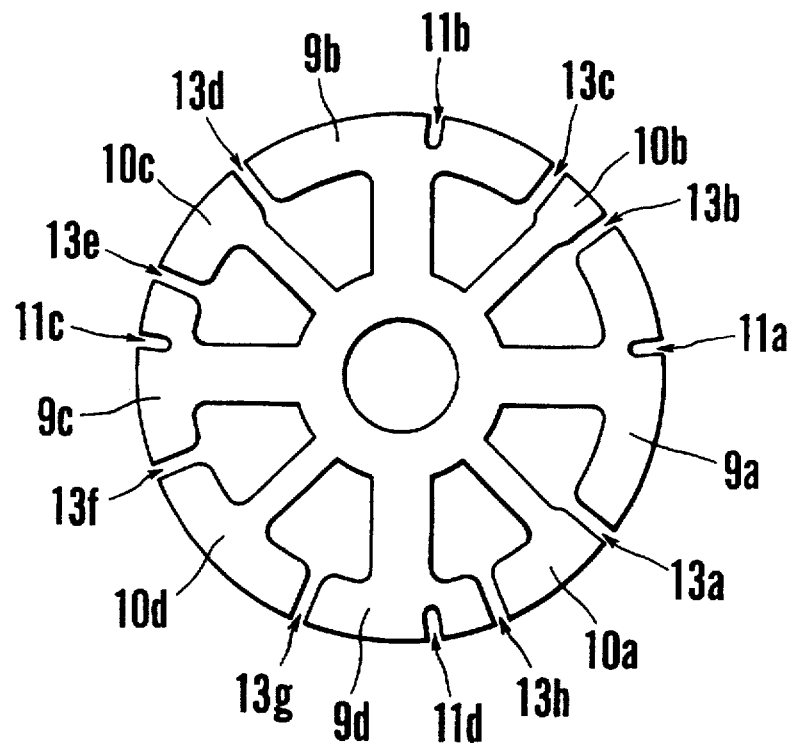
FIG. 6 is a plan view of the armature core of the motor depicted in FIG. 4.
Figure 7:
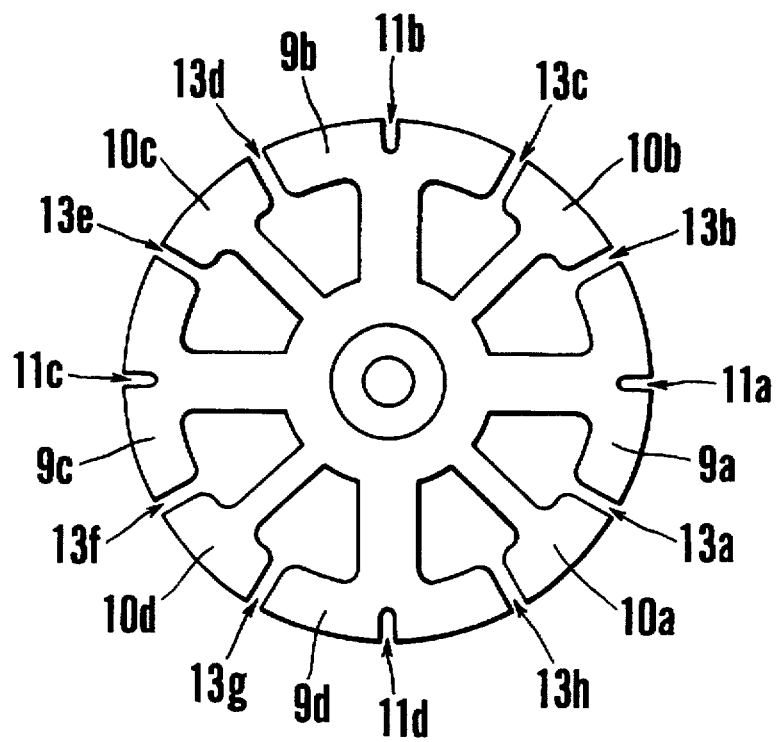
FIG. 7 is a plan view of the armature core of a conventional brushless motor, in which the auxiliary slots and winding slots are positioned at regular intervals.

FIG. 4 is a plan view of a two-phase, half-wave, four-pole drive brushless motor representing an example of the dynamoelectric machine in accordance with the present invention, and FIG. 5 is a longitudinal section of this motor. Furthermore, FIG. 6 depicts the armature core of this motor, and FIG. 7 depicts an example of the armature core for a conventional motor of the same type.

As can be seen in FIGS. 4 and 5, the motor comprises a rotor assembly 50 and a stator assembly 51, and, referring to FIG. 4, the rotor assembly 50 is obtained by fixedly press-fitting a shaft 5 in the center of a rotor yoke 1, fixedly bonding rotor magnets 2 around the inside of the rotor yoke 1 coaxially with the shaft 5, and performing magnetization to obtain four poles. A magnet 12 used to sense the excitation switching position for motor energizing are fixedly bonded to the end faces of the rotor magnets 2, as shown in FIG. 5.

The stator assembly 51 is obtained by a process in which a bearing 4 is fixedly crimped to a substrate 7 in a perpendicular manner, the product obtained by laminating a plurality of layers of armature cores 3 is insulated, and the product provided with a winding 8 is fitted into the bearing 4, as shown in FIG. 5.

Hall element 6, which serve as a sensor used to detect the excitation switching position for motor energizing, are secured on the substrate 7 opposite the magnets 12 for sensing the switching position that are provided to the rotor assembly 50.

The shaft 5 is inserted into the bearing 4 to rotatably support the rotor assembly 50 in relation to the stator assembly 51.

Referring to FIG. 6, four main poles 9a through 9d and four auxiliary poles 10a through 10d are installed facing each other at prescribed intervals with respect to the rotor magnets 2.

Two-phase windings 8a and 8b are provided to the winding slots 13a through 13h, which are located between the main poles 9a through 9d and the auxiliary poles 10a through 10d; and electric current is alternately passed through the windings in accordance with an appropriate timing, based on the rotor position sensed by the hall elements 6 and by the magnets 12 used to sense the excitation switching position for motor energizing.

In the armature core of the conventional motor depicted in FIG. 7, the tips (hammer portions) of all four main poles 9a through 9d have the same width, the tips (hammer portions) of all four auxiliary poles 10a through 10d have the same width as well, and the tips of the four main poles 9a through 9d are provided with central auxiliary slots 11a through 11d, respectively. The width (circumferential distance) of the auxiliary slots 11a through 11d is equal to the width of the winding slots 13a through 13h, the depth (radial distance) of the slots exceeds the slot width, and the winding slots and auxiliary slots are made magnetically equivalent to field permanent magnets. A total of 12 winding slots and auxiliary slots are provided, and these are arranged at regular angular intervals that correspond to an electrical angle of $(2\pi/6)w$ ($w=0, 1, 2, \ldots, 11$).

In this case, an m-order component of the cogging torque can be expressed by Equation (25).

$$\{T_c(\theta)\}_m = \sum_{w=0}^{11} A_m \sin\{m(\theta + 2\pi w/6 + \phi_m)\} \quad (25)$$

Figure 10:
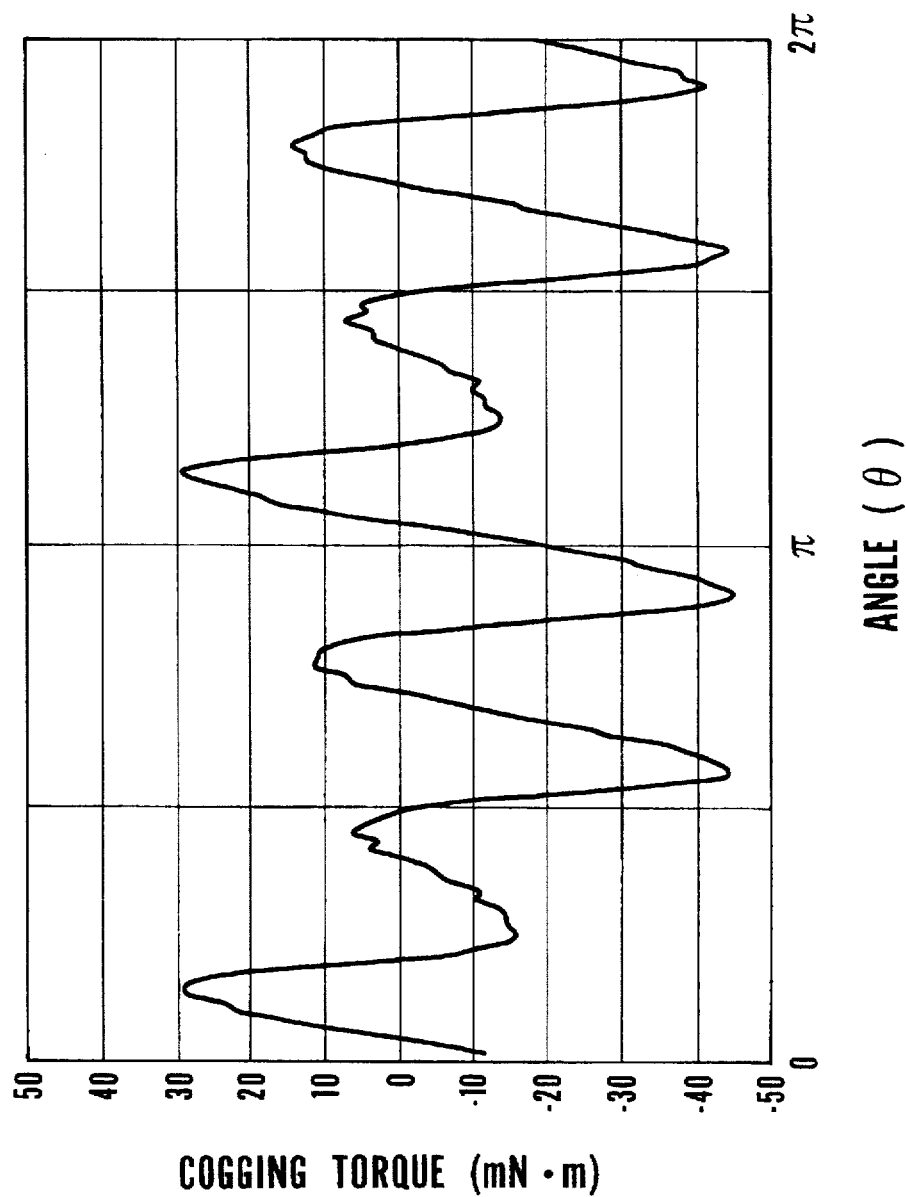
FIG. 10 depicts the waveform of the cogging torque of a conventional motor featuring the armature core depicted in FIG. 7.
Figure 11:
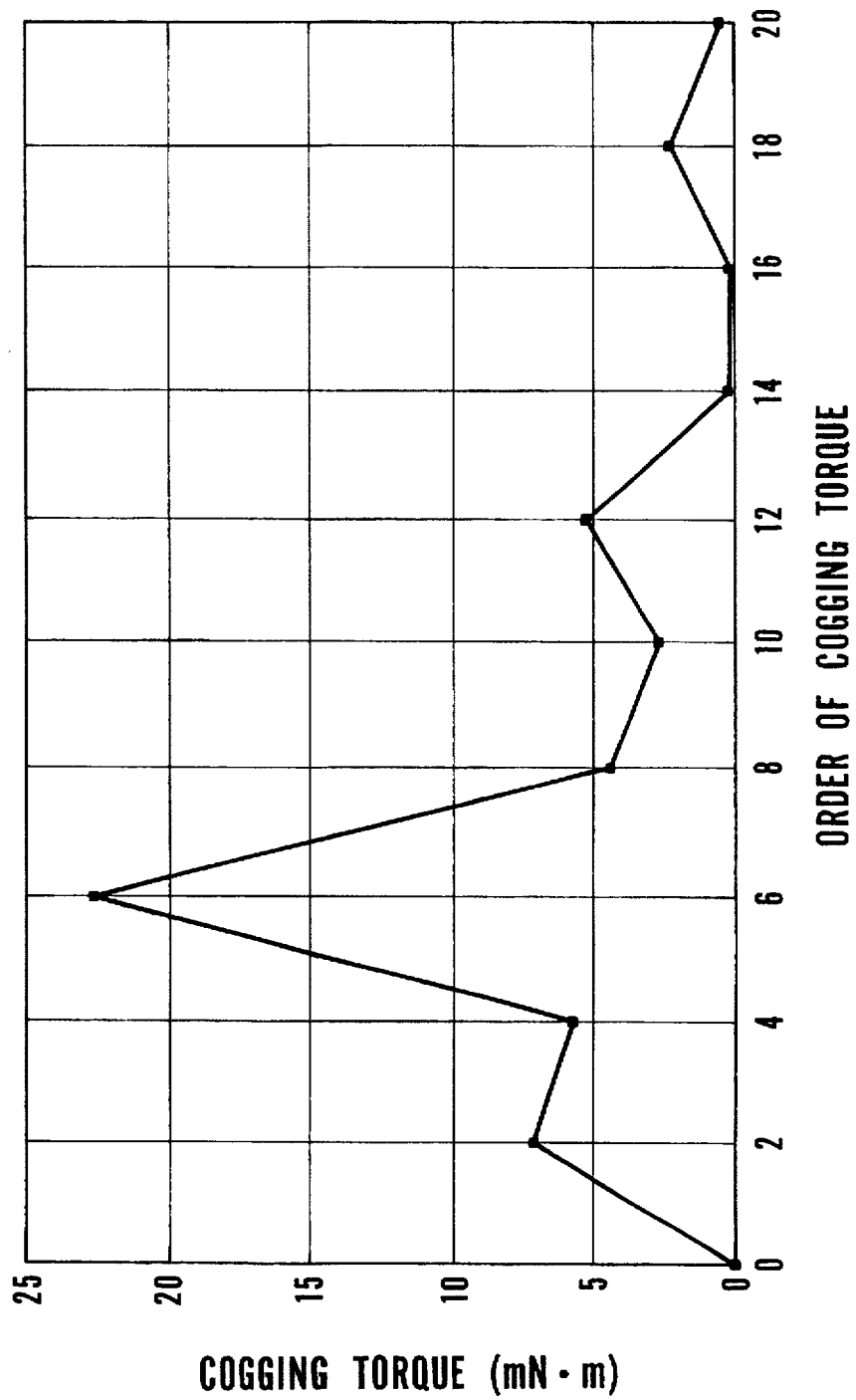
FIG. 11 is a power-series expansion graph of the cogging torque of the conventional motor depicted in FIG. 10.

It can be seen from this equation that the slots cancel out the cogging torque components up to m=5 as well as those m-order components of the cogging torque for which m≠6 h (where h is a natural number). FIG. 10 depicts the cogging torque waveform of a conventional motor, and FIG. 11 depicts a power-series expansion graph of the waveform in FIG. 10.

Figure 12:
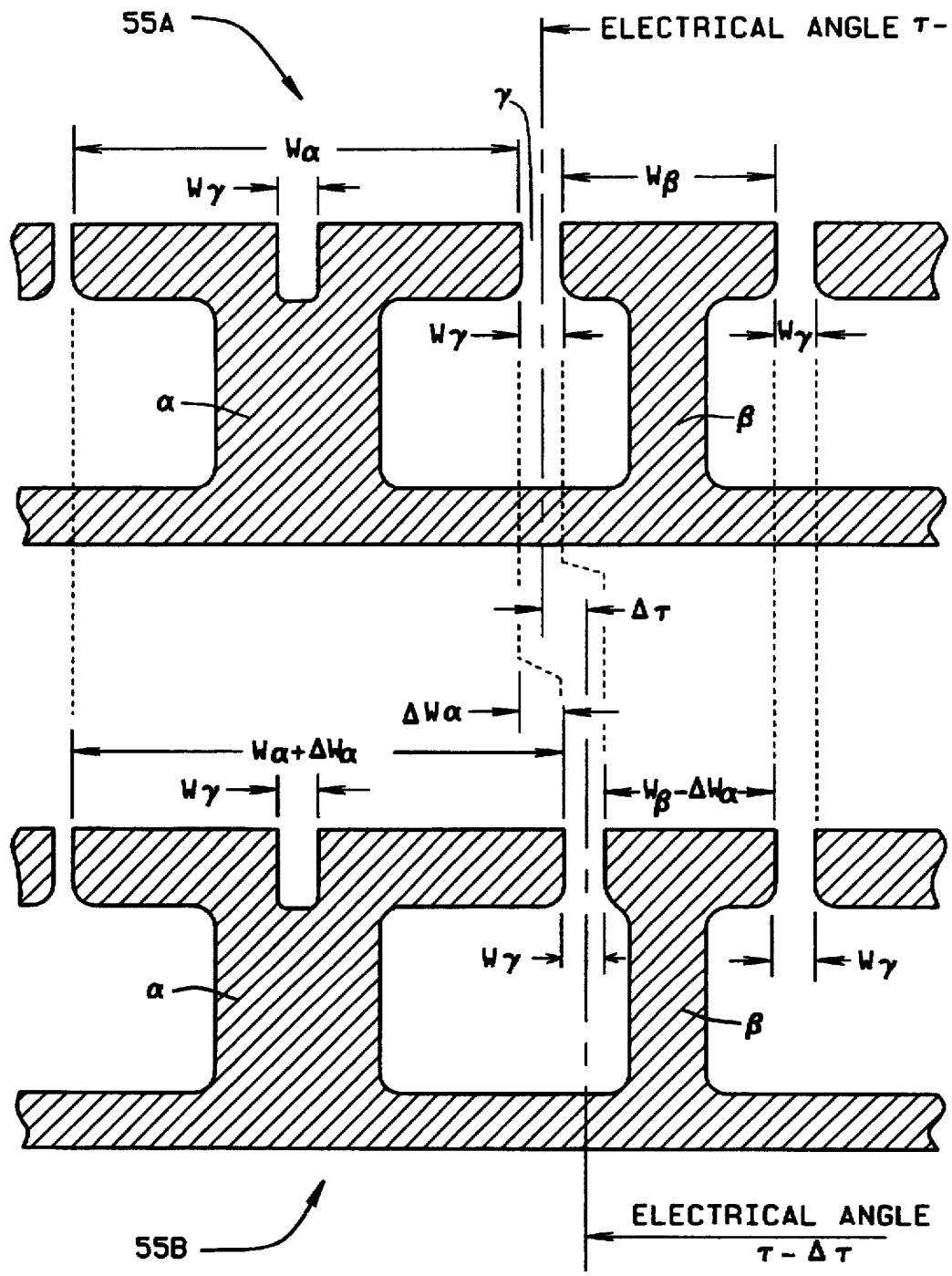
FIG. 12A is a diagram illustrating the phase and the armature core for an arrangement in which the slots are arranged at a constant pitch in accordance with prior art.
FIG. 12B is a diagram illustrating the phase and the armature core for an arrangement in which the hammer widths of the auxiliary poles and the main poles are varied with the position of the auxiliary slots in accordance with the present invention.
Figure 12A:
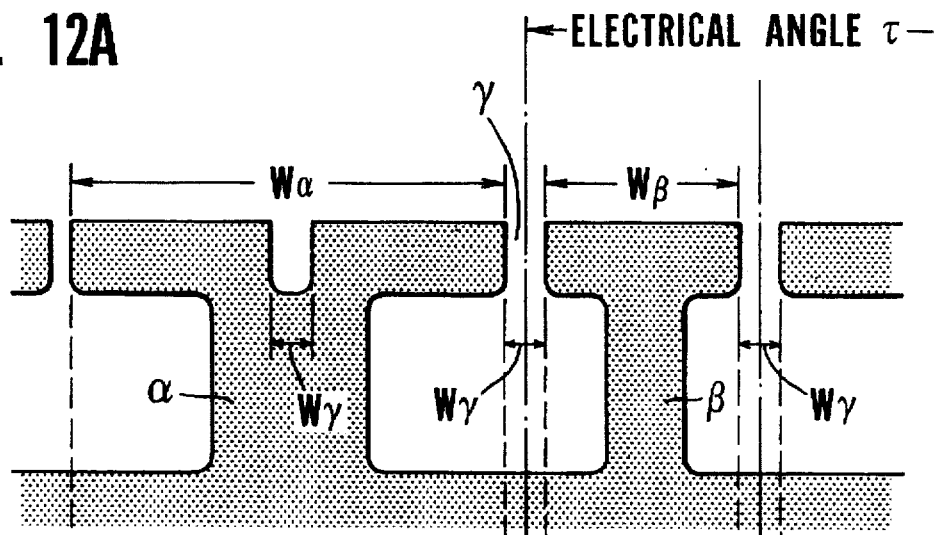
Figure 12B:
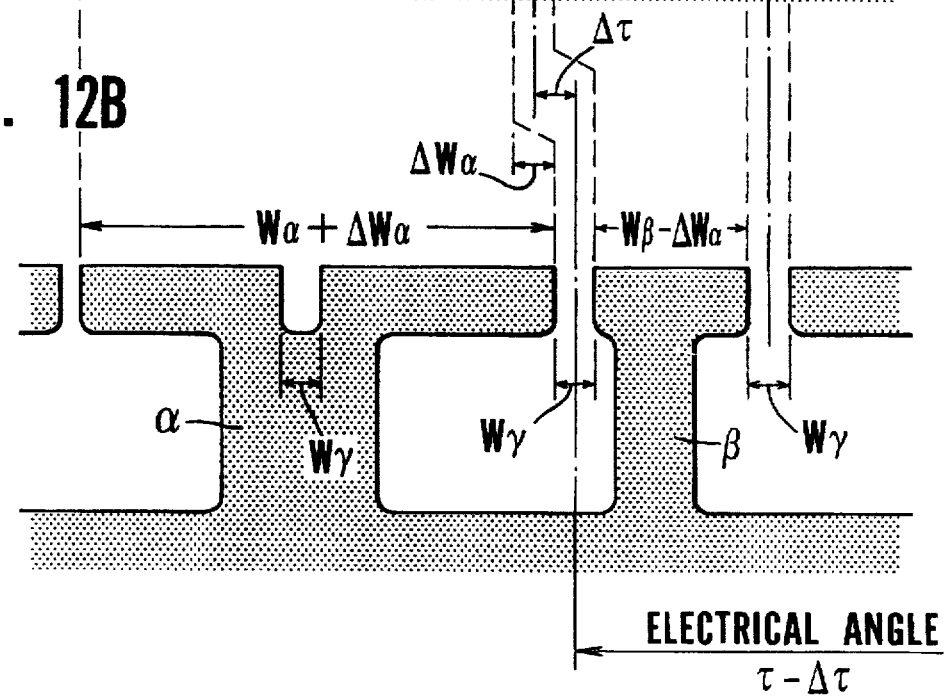

Let us now consider a winding slot γ formed between a main pole α and a auxiliary pole β in an arrangement in which, as in a conventional motor, the winding slots and auxiliary slots are arranged at a constant pitch, as shown in FIG. 12A. Let us also try the change the hammer width $W_\alpha$ of the main pole a from the conventional value shown in FIG. 12A to ($W_\alpha + \alpha W_\alpha$), as in the present invention depicted in FIG. 12B, and to change the hammer width of the auxiliary pole β from the conventional width $W_\beta$ shown in FIG. 12A to the width ($W_\beta - \Delta W_\alpha$) of the present invention depicted in FIG. 12B. As can be seen, the result is that the width $W_\gamma$ of the winding slot γ does not change, but the phase τ (electrical angle) of the slot γ changes from τ to (τ−Δτ).

It is thus possible to create two groups of slots with a mutual phase difference of π/k by changing the hammer width of the main poles and commutating poles to obtain the result Δτ=±π/(2 k), and by changing the phase τ' of the auxiliary slots to Δτ'=±π/(2 k). The phase difference of each slot in each group is expressed by Equation (26).

$$(2 \pi i)/k + 2 \pi p \quad (26)$$

Similar to the conventional example, the armature core of the embodiment of the present invention is provided with a total of 12 winding slots and auxiliary slots. As shown in FIG. 6, however, in the embodiment under consideration the tips (hammer portions) of the four main poles 9a through 9d are such that the hammer width of two main poles, 9a and 9b, exceeds the hammer width of the other two main poles 9c and 9d. In addition, the tips (hammer portions) of the four auxiliary poles 10a through 10d have three different widths. Furthermore, the auxiliary slots 11a through 11d in the tips of the four main poles 9a through 9d are shifted away from the center of the main poles. Due to this configuration, six of the winding slots and auxiliary slots (11a, 13b, 13g, 11d, 13d, and 13e, designated as "slot group A") are arranged at a certain electrical angle (the angle of the auxiliary slot 11a is taken to be zero) in the positions expressed by Equation (27) below.

$$(2 \pi/6)i + 2 \pi p \quad (27)$$

where i and p assume the values shown in Table 1 below for each slot.

TABLE 1

| Slot | 11a | 13b | 13g | 11d | 13d | 13e |
|------|-----|-----|-----|-----|-----|-----|
| i    | 0   | 1   | 2   | 3   | 4   | 5   |
| p    | 0   | 0   | 1   | 1   | 0   | 0   |

The six remaining winding slots and auxiliary slots (11c, 13f, 13c, 11b, 13h, and 13a, designated as "slot group B") occupy the positions expressed by Equation (28) below.

$$(2 \pi/6)j + 2 \pi q + \pi/6 \quad (28)$$

where j and q assume the values shown in Table 2 below for each slot.

TABLE 2

| Slot | 11c | 13f | 13c | 11b | 13h | 13a |
|------|-----|-----|-----|-----|-----|-----|
| j    | 0   | 1   | 2   | 3   | 4   | 5   |
| q    | 1   | 1   | 0   | 0   | 1   | 1   |

Equation 29 expresses the m-order components $\{T_c(\theta)\}_{m1}$ of the cogging torques of the first group of slots.

$$\{T_c(\theta)\}_{m1} = \sum_{i=0}^{5} A_m \sin\{m(\theta + 2\pi i/6 + 2\pi p + \phi_m)\} \quad (29)$$

As can be seen from the equation, the slots cancel out the components of the cogging torque up to m=5 as well as those m-order components of the cogging torques for which m≠6 h (where h is a natural number). Consequently, the m-order components $\{T_c(\theta)\}_{m2}$ of the cogging torques generated by the second group of slots can be expressed by Equation (30).

$$\{T_c(\theta)\}_{m2} = \sum_{j=0}^{6} A_m \sin\{m(\theta + 2\pi j/6 + 2\pi q + \pi/6 + \phi_m)\}) \quad (30)$$

Figure 8:
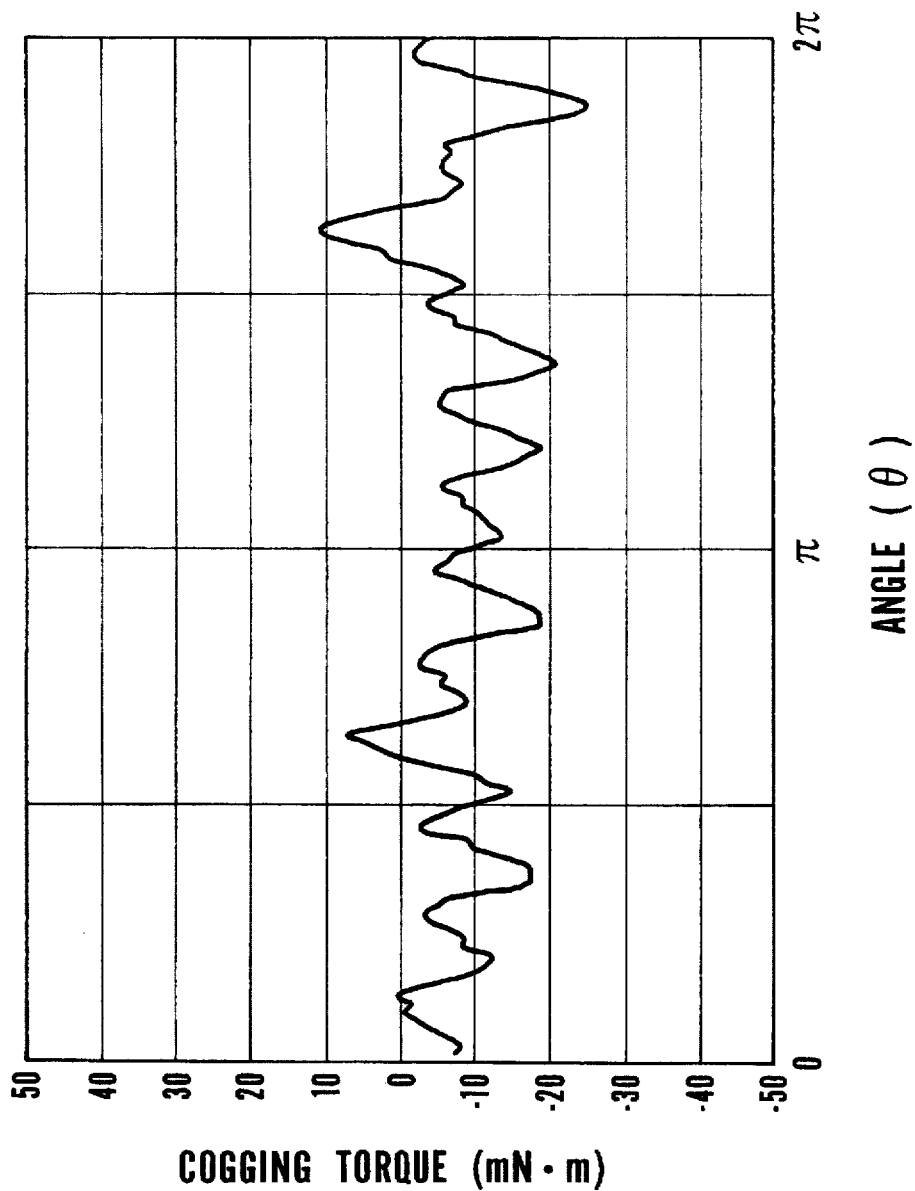
FIG. 8 depicts the waveform of the cogging torque of the two-phase, half-wave, four-pole drive brushless motor in accordance with the present invention.
Figure 9:
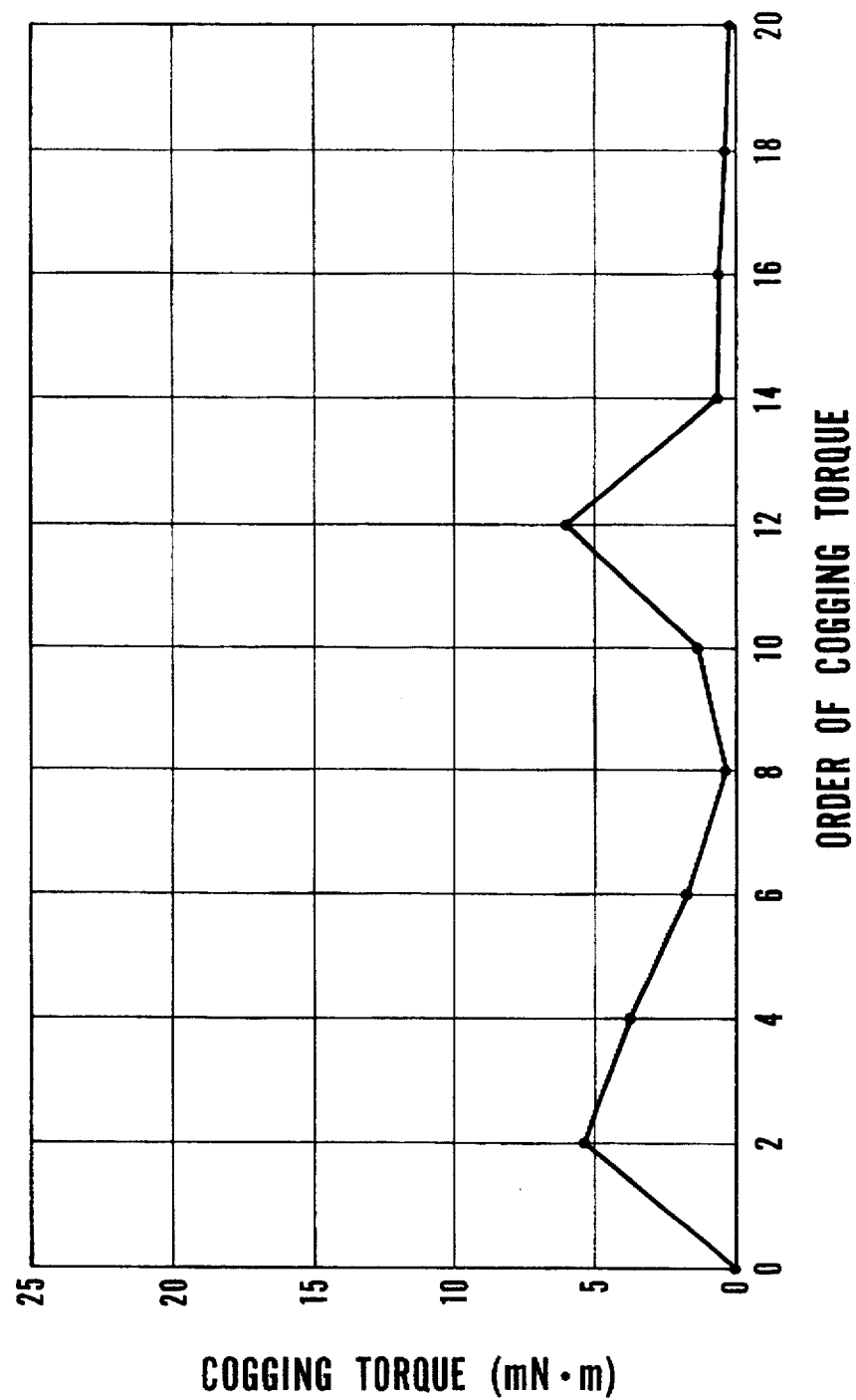
FIG. 9 is a power-series expansion graph of the cogging torque depicted in FIG. 8.

As can be seen from the equation, the slots cancel out the components of the cogging torque up to m=5 as well as those m-order components of the cogging torques for which m≠6 h (where h is a natural number). Another feature is that the existence of a phase difference of π/6 between the first and second groups of slots allows the first and second groups of slots to cancel out the six-order components of the cogging torques and those m-order components of the cogging torques for which m=6 $h_0$ (where $h_0$ is an odd number). FIG. 8 depicts the cogging torque waveform of the motor in the embodiment under consideration, and FIG. 9 depicts a power-series expansion graph of the waveform in FIG. 8. A comparison with the cogging torques of the motor in the conventional example (FIGS. 10 and 11) indicates that the motor of the present invention generates cogging torques with much weaker 6- and 18-order (6×3) components, that is, components that could not be canceled in the conventional example.

Although the above embodiment was described with reference to a two-phase, half-wave drive brushless motor, the present invention may also be applied to a dynamoelectric machine which is provided with permanent-magnet field portions and with an armature core having main poles and auxiliary poles, in which the winding slots are located between the main poles and auxiliary poles, and in which auxiliary slots are provided to the main poles or auxiliary poles, making it possible to achieve the same effect.

In the present invention, winding slots and auxiliary slots provided to main poles, auxiliary poles, or both are divided into two groups, and the slots of each group occupy positions that correspond to different electrical angles established in accordance with a predetermined formula, making it possible to markedly reduce the number of slots and to achieve the same cogging torque reduction effect as in a method in which these slots are arranged at regular intervals in a conventional motor. Specifically, although the conventional arrangement of slots at regular intervals can cancel out cogging torque components ranging from first-order components to (k−1)-order components, as well as the m-order components for which the m is not a natural multiple of k, the nonequidistant arrangement according to the present invention, in addition to demonstrating the conventional cogging torque reduction effect, can cancel out the k-order components of the cogging torque and the m-order components for which the m is an odd multiple of k, making it possible to achieve the same cogging torque reduction effect by utilizing no more than half the number of slots employed in the past, even when the cancellation of higher components is ignored. As a result, the magnetic field flux generated by constant-magnet field portions can be efficiently interlinked with the magnetic flux of the armature; a motor of the same volume can yield a higher output, or the same output can be achieved with a smaller motor in comparison with a conventional motor of the same type; and cost reductions and other advantages can be achieved in a motor of the same volume and power by employing lower-grade magnets and reducing vibration or rotation nonuniformity due to reduced cogging torque.

What is claimed is:

1. A dynamoelectric machine, comprising:

a permanent-magnet field portion having 2 n magnetic poles (where n is an even number);

an armature core portion having 2 n main poles disposed facing each other at prescribed intervals in relation to said field portion, 2 n auxiliary poles disposed between said main poles, and a number of winding slots provided between the main poles and auxiliary poles; and auxiliary slots provided on at least some of the surfaces of said main poles and said auxiliary poles that face the field portion;

wherein k is an integer not less than 4, nk is the sum of the number of winding slots provided between said main poles and said auxiliary poles and the number of auxiliary slots provided on surfaces of the main poles and auxiliary poles;

wherein all of said winding slots and auxiliary slots are divided into two groups of nk/2 slots each;

the slots of a first of said two groups of winding slots and auxiliary slots occupy positions $\phi_i$ that satisfy, in terms of electrical angle, the relation $\phi_i = (2\pi/k)i + 2\pi p$ (i=0, 1, 2, ..., (nk/2)−1; and p is an integer $0 \leq p \leq (n−1)$); and the slots of a second of said two groups of winding slots and auxiliary slots occupy positions $\phi_j$ that satisfy the relation $\phi_j = (2\pi/k)j + 2\pi q + \pi/k$ (j=0, 1, 2, ..., (nk/2)−1; q is an integer $0 \leq q \leq$ integer of (n−1)).

2. The dynamoelectric machine of claim 1, wherein said main poles and said auxiliary poles each have tips, and wherein the tips of the main poles and the tips of the auxiliary poles differ in width.

3. The dynamoelectric machine of claim 1, wherein said dynamoelectric machine is a two-phase, half wave drive brushless motor.

4. A dynamoelectric machine comprising a rotor assembly and a stator assembly, the rotor assembly having winding slots, auxiliary slots, main poles, and auxiliary poles; the improvement comprising the winding slots and auxiliary slots being spaced at unequal radial intervals between the main poles and the auxiliary poles.

5. The dynamoelectric machine of claim 4, wherein a group of slots consisting of the winding slots and the auxiliary slots are divided into a first group of slots and a second group of slots, and the irregular intervals are selected so that a cogging torque of the first group of slots and a cogging torque of the second group of slots cancel each other out due to a phase difference between the two groups.

6. The dynamoelectric machine of claim 5, wherein the main poles each have a main pole tip, and the auxiliary poles each have an auxiliary pole tip, and wherein the main pole tips and auxiliary pole tips are varied in accordance with positions of the auxiliary slots.

7. The dynamoelectric machine of claim 4, wherein the dynamoelectric machine is a two-phase, half-wave drive brushless motor.

8. The dynamoelectric machine of claim 4, wherein the dynamoelectric machine is provided with permanent-magnet field positions and with an armature core having main poles and auxiliary poles, in which winding slots are located between the main poles and the auxiliary poles, and in which auxiliary slots are provided to at least either the main poles or the auxiliary poles.

9. The dynamoelectric machine of claim 4, wherein the auxiliary slots have a width and a radial depth, and the winding slots have a width, and wherein the width of the auxiliary slots is equal to the width of the winding slots, the radial depth of the auxiliary slots exceeds the width of the auxiliary slots, and the winding slots and the auxiliary slots are magnetically equivalent to field permanent magnets.

10. A rotor assembly for a dynamoelectric machine characterized by having a plurality of main poles and a plurality of auxiliary poles, winding slots between the main poles and the auxiliary poles, and auxiliary slots, the improvement comprising the winding slots and the auxiliary slots being spaced at unequal radial intervals.

11. The rotor of claim 10, wherein a group of slots consisting of the winding slots and the auxiliary slots are divided into a first group of slots and a second group of slots, and the irregular intervals are selected so that a cogging torque of the first group of slots and a cogging torque of the second group of slots cancel each other out due to a phase difference between the two groups.

12. The rotor of claim 11, wherein the auxiliary slots have a width and a radial depth, and the winding slots have a width, and wherein the width of the auxiliary slots is equal to the width of the winding slots, the radial depth of the auxiliary slots exceeds the width of the auxiliary slots, and the winding slots and the auxiliary slots are magnetically equivalent to field permanent magnets.

13. A dynamoelectric machine configured to cancel first-order components up to (k−1) of cogging torque, k-order components of cogging torque, and m-order components of cogging torque, including those components for which m is an odd multiple of k, where k and m are integers, and k is at least 4.

* * * * *